Patented Feb. 14, 1939

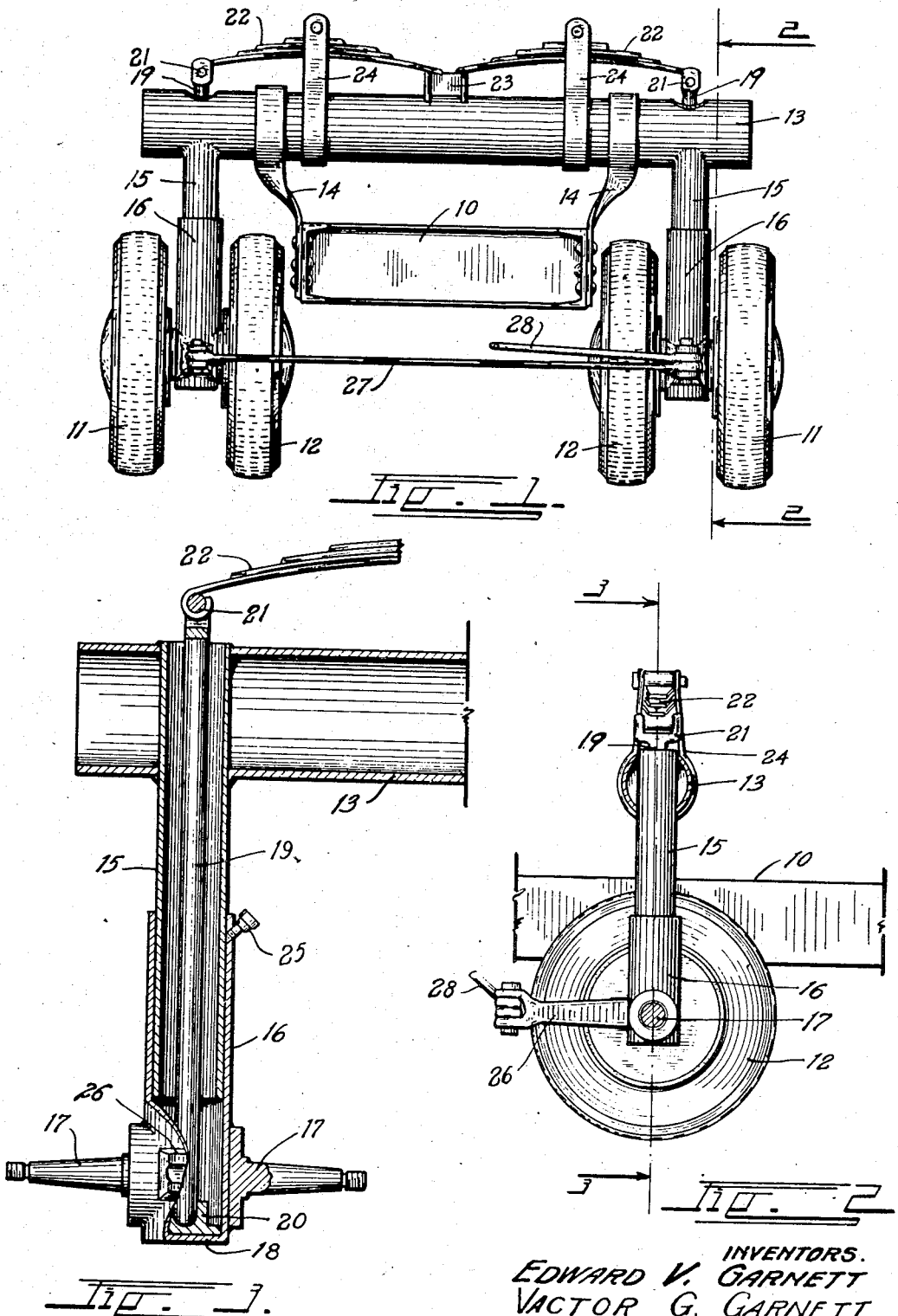

2,147,025

UNITED STATES PATENT OFFICE 2,147,025

WHEEL MOUNTING FOR VEHICLES

Vactor G. Garnett and Edward V. Garnett,
Denver, Colo.

Application March 19, 1937, Serial No. 131,840

5 Claims. (Cl. 280—106.5)

This invention relates to a wheel mounting for trucks, busses and other heavy vehicles. In the usual heavy vehicle dual tires are necessary in order to minimize the road load on any one wheel both for safety reasons and to comply with the road statutes of the various states. It is exceedingly difficult to support dual front wheels on a single cantilever axle stud extending from steering spindle, due to the excessive bending strain which is placed in the axle and spindle.

The principal object of the invention is to provide a front wheel suspension in which, the load will be positioned between the dual wheels so as to eliminate all bending strains upon the steering pivot and to minimize the strains in the wheel axles.

The excessive bending strain imposed by the long axle studs usually required for dual wheels, so clamps the steering spindle that steering is exceedingly difficult. Another object of this invention is to pivot the dual wheels at a point between them so that the two wheels counterbalance each other allowing them to be turned for steering purposes with a minimum of effort.

Other objects of the invention are to provide a spring construction for the front wheels of a vehicle which will: allow the chassis to have a low center of gravity; eliminate the necessity for camber and caster in the front wheels of a vehicle; allow either one of a pair of dual wheels to be removed without disturbing the other wheel of the pair; provide a pivotal, front, dual wheel mounting which will have a minimum of parts, and one which will be exceedingly rugged and substantial to safely withstand the strains imposed by exceedingly heavy loading, road-shocks, etc.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a front view of the improved dual wheel mounting in position on a truck chassis.

Fig. 2 is a side view thereof taken on the line 2—2, Fig. 1.

Fig. 3 is a detail section through the vertical post of the mounting, taken on the line 3—3, Fig. 2.

In the drawing, a truck chassis is indicated at 10 supported on front dual wheels. The outer wheel of each pair of dual wheels is indicated at 11 while the inner wheel of each pair is indicated at 12.

In this invention the chassis 10 is suspended from a tubular cross beam 13 by means of suitable hangers 14. Extending downwardly through each extremity of the cross beam 13 is a tubular post member 15. The lower extremities of the post members 15 extend into bearing sleeves 16 which telescopically engage the posts.

The bearing sleeves 16 are formed with oppositely extending stub axles 17, adjacent their lower extremities for receiving the wheels 11 and 12, and the bottom of the sleeves are sealed by means of a bottom plate 18.

The weight on the wheels is transmitted to the bearing sleeves 16 by means of vertical spring shafts 19 which extend downwardly within the tubular posts 15 and rest in bearing cups 20 on the bottom plates 18. The upper extremity of each spring shaft 19 is hinged by means of a suitable yoke 21 to the outer extremity of a cantilever spring 22. The inner extremities of the cantilever springs 22 rest upon a seat 23 on the tubular cross beam 13. The mid portions of the springs 22 are tied down by means of spring hangers 24 to the cross beam 13.

It can be readily seen that the weight of the truck is suspended from the mid portion of the springs 22 through the medium of the hangers 24 and that this load is resiliently transmitted to the spring shafts 19 and through them to the bearing sleeves 16, thence to the wheels 11 and 12.

The wheels are free to turn in a horizontal plane for the purpose of steering since the bearing sleeves 16 are free to rotate about the post 15 and the only point of the bearing friction is at the lower points of the shaft 19 in the bearing cup 20.

The bottom of the sleeves 16 can be kept partially filled with grease so that the friction point is always well lubricated. The sleeves may be provided with "alemite" couplings 25 for greasing the surfaces between the posts 15 and the sleeves 16.

A steering arm 26 is projected forwardly from each of the sleeves 16 and the arms are tied together by means of a tie rod 27. A steering rod 28 is led from either of the arms 26 to the regular steering mechanism of the truck.

The usual heavy truck or bus is so difficult to guide and hold in the road, due to the excessive bending load upon the front axle studs, that it is necessary to incline the wheels for "caster" so that they will automatically assist in returning themselves to the straight line position. It is also difficult to hold the usual truck front wheels on the road due to the fact that road shocks against the wheels, being on the one side of the steering shaft, can easily turn them from the desired path. It is, therefore, necessary to provide the wheels with "camber" in order to assist the driver in holding them on the road. In the present invention, however, it has been found, by actual experience with loads up to 20 tons, that it is not necessary to adjust the wheels for either "camber" or "caster". This is due to two things; first, each member of the pair of dual wheels is on the opposite side of the pivot shaft from the other member so that road shocks are counteracted without effecting the steering mechanism; second, the central position of the steering shaft absolutely removes all excessive bending strains so that there is no cramping regardless of the loads and the vehicle can be easily controlled by the driver at all times.

It is found that there is sufficient resiliency in the tubular beam 13 and in the posts 15 to accommodate any load irregularity between the dual wheels 11 and 12. This resiliency also accommodates any angular position of the beam 13 due to unequal loading of the truck.

In the usual heavy truck the axles are arched upwardly at the mid point and downwardly at the outer extremities so that when the truck is loaded the two dual wheels will bear uniformly on the road. When empty or under light loads, however, the camber of the axle places all of the weight on the outer one of the dual wheels thus causing the outer tire to wear more rapidly in cambered trucks and the inner tire to wear more rapidly in noncambered trucks. With the present invention, however, with the load between the tires, the load is divided equally between the two tires of each dual wheel regardless of the truck loading. Another reason for the uniform tire wear in the present construction resides in the fact that the wheels are independent of each other and can therefore have a differential rotation while rounding curves. In the usual trucks the dual wheels are fixed together so that one or both must slide in rounding a curve.

While the invention has been described as applied to the front or steering wheels of a truck it is, of course, not limited to this particular position since the method of suspension and center balance is equally important on trailer wheels where no steering is required.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A spring supported, front wheel mounting for vehicles comprising: a cross beam extending laterally of said vehicle; a tubular post member extending downwardly adjacent each extremity of said cross beam; a bearing sleeve fitted over the lower extremity of each post member; axle studs extending oppositely outward from said bearing sleeves; a wheel mounted on each axle stud; a shaft bearing in each of said bearing sleeves; a bearing shaft extending from each of said shaft bearings upwardly through and projecting from said post members; and a spring for absorbing the upward thrust of said bearing shafts.

2. A spring supported, front wheel mounting for vehicles comprising: a cross beam extending laterally of said vehicle; a tubular post member extending downwardly adjacent each extremity of said cross beam; a bearing sleeve fitted over the lower extremity of each post member; axle studs extending oppositely outward from said bearing sleeves; a wheel mounted on each axle stud; a shaft bearing in each of said bearing sleeves; a bearing shaft extending from each of said shaft bearings upwardly through and projecting from said post members; a leaf spring overlying said beam; means for tieing the mid portion of said spring to said beam; means for supporting one extremity of said spring, and means for transmitting the upward thrust of said bearing shaft to the other extremity of said spring.

3. A spring supported, front wheel mounting for vehicles comprising: a cross beam extending laterally of said vehicle; a tubular post member extending downwardly adjacent each extremity of said cross beam; a bearing sleeve fitted over the lower extremity of each post member; axle studs extending oppositely outward from said bearing sleeves; a wheel mounted on each stud; a bearing in each sleeve; a bearing shaft extending from each bearing upwardly through and projecting from said post members; a pair of leaf springs overlying said beam; means for tieing the mid-portions of each spring to said beam; means for transmitting the upward thrust of each bearing shaft to one extremity of one of said springs; means for supporting the other extremity of each spring and means for rotating said sleeve about said post for the purpose of steering said vehicle.

4. A spring supported, front wheel mounting for vehicles comprising: a cross beam extending laterally of said vehicle; a tubular post member extending downwardly adjacent each extremity of said cross beam; a bearing sleeve fitted over the lower extremity of each post member; axle studs extending oppositely outward from said bearing sleeves; a wheel mounted on each stud; a central bearing in each sleeve; a shaft resting on each bearing and extending upwardly through and projecting from said post members; a pair of leaf springs overlying said beam; means for tieing the mid-portions of each of said springs to said beam; means for transmitting the upward thrust of each bearing shaft to one extremity of one of said springs; means for supporting the other extremity of each spring; a steering arm projecting from said sleeve; and means for swinging said steering arm for steering said vehicle.

5. A wheel mounting for vehicles comprising: a cross beam extending transversely of said vehicle; a tubular post member extending downwardly adjacent each extremity of said cross beam; a bearing member telescopically fitted to each post member; axle studs extending oppositely outward from each bearing member; a wheel mounted on each axle stud; and a spring for absorbing the upward thrust of each of said bearing members, said springs being positioned above said cross beam.

VACTOR G. GARNETT.
EDWARD V. GARNETT.